(12) United States Patent
Leech

(10) Patent No.: US 7,752,444 B2
(45) Date of Patent: Jul. 6, 2010

(54) SYSTEM AND METHOD FOR PROVIDING IDENTITY HIDING IN A SHARED KEY AUTHENTICATION PROTOCOL

(75) Inventor: Marcus Leech, Smith Falls (CA)

(73) Assignee: Nortel Networks Limited

( * ) Notice: Subject to any disclaimer, the term of this patent is extended or adjusted under 35 U.S.C. 154(b) by 1201 days.

(21) Appl. No.: 11/314,403

(22) Filed: Dec. 21, 2005

(65) Prior Publication Data

US 2007/0180247 A1    Aug. 2, 2007

(51) Int. Cl.
  *H04L 9/00* (2006.01)
(52) U.S. Cl. ............... 713/171; 713/168; 713/169; 726/2; 726/3; 726/5; 726/6; 726/7; 709/227; 709/228; 380/28
(58) Field of Classification Search ............... 713/171
  See application file for complete search history.

(56) References Cited

U.S. PATENT DOCUMENTS

| | | | |
|---|---|---|---|
| 7,272,381 B2 * | 9/2007 | Aura ..................... | 455/410 |
| 7,486,795 B2 * | 2/2009 | Eschenauer et al. ......... | 380/277 |
| 7,571,318 B2 * | 8/2009 | Strongin et al. ............ | 713/166 |
| 2003/0226017 A1 * | 12/2003 | Palekar et al. ............. | 713/168 |
| 2004/0030932 A1 * | 2/2004 | Juels et al. ................ | 713/202 |
| 2004/0133513 A1 * | 7/2004 | McCoy et al. .............. | 705/40 |
| 2004/0225880 A1 * | 11/2004 | Mizrah ..................... | 713/155 |
| 2006/0004772 A1 * | 1/2006 | Hagan et al. ............... | 707/10 |
| 2007/0106892 A1 * | 5/2007 | Engberg .................... | 713/168 |

OTHER PUBLICATIONS

Microsoft Corp., '.NET Passport Authentication', Microsoft Corp., Aug. 22, 2005, entire document and information as per associated linked URLs, http://technet.microsoft.com/en-us/library/cc778966(WS.10,printer).aspx.*
Abadi, M., et al, 'Just Fast Keying in the Pi Calculus', ACM Journal Name, vol. V, No. N, Jan. 2007, pp. 1-54, http://citeseerx.ist.psu.edu/viewdoc/download?doi=10.1.1.62.3441&rep=rep1&type=pdf.*

* cited by examiner

*Primary Examiner*—Edan Orgad
*Assistant Examiner*—Ronald Baum
(74) *Attorney, Agent, or Firm*—Anderson Gorecki & Manaras LLP

(57) ABSTRACT

A system and method is provided for hiding an initiator's identity (ID), e.g. a ClientID, in a shared key authentication protocol, using authentication based on a hint of the ID. The hint is a function of the ID which cannot be readily inverted to produce the initiator's identity, for example, a hash function over the ID, such as a modular N sum hash of the initiator's identity where N corresponds to N hash buckets in a shared key database; a cryptographic hash over the ID and a corresponding shared key; or a function of the ID which cannot be readily inverted to produce the initiator's identity and a pair of MAC values wherein the MAC values are compared to find a shared key. The resulting hash may be reduced to a required number of bits for identification of a hash bucket in the database. The system and method thereby provide a computationally efficient method of protecting, or hiding, a client ID in a client-server system for shared-key authentication, which avoids the requirement of known systems to send the client ID in clear text early in the message exchange, which leaves known shared-key protocols open to passive and active identity disclosure attacks.

30 Claims, 5 Drawing Sheets

SYSTEM AND METHOD FOR PROVIDING IDENTITY HIDING IN A SHARED KEY AUTHENTICATION PROTOCOL

FIELD OF THE INVENTION

The present invention relates to cryptographic systems, and in particular, to a system and method for providing identity hiding for mutual authentication and key agreement in a shared key protocol.

BACKGROUND

Cryptographic systems and methods that provide authentication, secrecy and integrity for communications between a pair of nodes communicating over an insecure channel are typically based on shared key and public key protocols. Shared key mutual authentication protocols, for example, EAP-PSK (Extensible Authentication Protocol-Pre-Shared Keys) and EAP-PAX (Extensible Authentication protocol-Password Authenticated Exchange), offer benefits that are attractive to many network operators and equipment manufacturers. Such protocols are computationally inexpensive, when compared with functionally similar protocols that use public-key operations such as Diffie-Hellman and RSA. Shared key protocols typically have a lower infrastructural cost when compared with public-key schemes, creating an industry perception of simplicity and lower management costs associated with shared key schemes.

Nevertheless, there is an inherent lack of identity protection, or identity hiding, in today's shared key protocols. Specifically, the receiving end of the negotiation must know in advance what the identity of the initiator is, so that the receiver may locate the appropriate key in a shared key client/user database. For example, in typical shared key protocols, the client end of the negotiation must send their identity, in plain-text, very early in the exchange. This lack of identity hiding stems from the inherent properties of known shared key protocols. In contrast, protocols that use public-key methods can arrange for the server to be fully authenticated prior to the client ever sending its identity. Therefore, if an identity-protecting mutual authentication and key agreement is required in a shared key protocol, typically some combination of Diffie-Hellman key agreement and public-key signatures are used instead.

There are a plethora of protocols that provide variations on a basic shared key protocol, but they share the same semantics, and the requirement for the client to identify itself to the server in order for the server to determine the correct key to use for further computations in the protocol. Thus such protocols are subject to both passive and active identity disclosure attacks.

Passive attacks may be prevented by wrapping the protocol with a Diffie-Hellman based key exchange and encrypting the protocol exchange using the resulting key, but doing so removes the computational efficiency of shared key protocols, and does not address active identity disclosure attacks that use man-in-the-middle (MITM) attack scenarios. To provide protection against active disclosure attacks, the server at least must identify itself in a verifiable way, using public-key signatures (typically RSA or DSA) with cryptographically fresh data. This increases the computational burden on the part of the server.

Accordingly, there is a need for a system and method that can allow a client and server to agree on a shared key, which protects the client identity in a more computationally efficient manner, and avoids the above mentioned problems.

SUMMARY

It is an object of the present invention to obviate or mitigate at least one of the problems associated with identity disclosure and known shared key authentication protocols.

According to one aspect of the present invention there is provided a method of hiding an initiator's identity (ID) in a shared key authentication protocol comprising authentication based on a hint of the ID, wherein the hint is a function of the ID which cannot be readily inverted to produce the initiator's identity.

The hint of the ID may be a permutated value of the ID, such as a hash function over the ID. An example is a modular N sum hash of the initiator's identity where N corresponds to N hash buckets in a shared key database. Alternatively, the hint comprises a cryptographic hash over the ID, or a cryptographic hash over the ID and a corresponding shared key Thus there is provided a method to hide an initiator's identity in a shared key authentication protocol. This method reduces problems of passive or active identity disclosure attacks associated with disclosure of client identity in clear text early in message exchange in known shared key authentication protocols. The method may be implemented in a computationally efficient way relative to functionally similar protocols that use public-key operations, such as Diffie-Hellman and RSA, to provide identity protection.

The resulting hash may be reduced to a required number of bits for identification of a hash bucket in the database: hint=Reduce (H(ID, Key)) where H(x) is a chosen hash function and Reduce is a function to reduce the output of the hash function to the required number of bits.

The chosen hash function may be, for example, one of MD5, SHA-1, HMAC, Tiger, RIPEM-D, MD2, and SHA-2 family, or other suitable known hash functions and variants.

According to another aspect of the present invention there is provided a method of hiding an initiator's identity (ID) in a shared key authentication protocol comprising authentication based on a hint of the ID wherein the hint is a function of the ID which cannot be readily inverted to produce the initiator's identity and a pair of MAC values wherein the MAC values are compared to find a shared key.

According to another aspect of the present invention there is provided a system for hiding an initiator's identity (ID) in a shared key authentication protocol comprising a database to store shared keys and an authenticator to provide authentication of the initiator based on a hint of the ID wherein the hint is a function that of the ID that cannot be easily inverted to produce the initiator's identity.

The initiator may be a client and the receiver may be a server. The database of shared keys maybe structured as N linear arrays with array indices based on the hint of the initiator identity. The client includes a processor to generate a hint of the ID and a MAC value.

According to another aspect of the invention, there is provided a machine-readable medium encoded with a plurality of processor-executable instruction sequences for hiding an initiator's identity (ID) in a shared key authentication protocol comprising authentication based on a hint of the ID wherein the hint is a function of the ID which cannot be readily inverted to produce the initiator's identity and a pair of MAC values wherein the MAC values are compared to find a shared key.

According to another aspect of the invention there is provided a method of hiding an initiator's identity (ID) in a shared key authentication protocol for authentication and shared key agreement between an initiator and a receiver comprising steps by the initiator of: generating a Hint of the ID, the Hint being a function of the ID which cannot be readily inverted to produce the initiator's identity; generating a MAC; transmitting the Hint of the ID and MAC to the receiver for authentication and key agreement Further aspects of the invention provide for a method of hiding an initiator's identity (ID) in a shared key authentication protocol for authentication and shared key agreement between an initiator and a receiver comprising steps by the receiver of: receiving from an initiator a Hint of the ID, the Hint being a function of the ID which cannot be readily inverted to produce the initiator's identity, and a MAC value; and providing authentication and key agreement based the Hint and MAC values.

Where authentication and key agreement is between a client and a server, method steps performed by the client comprise generating a message, a message authentication code and a hash over the client identifier and a corresponding shared key; transmitting to the server said message, message authentication code and hash over the client identifier and a corresponding shared key to the server, for processing by the server for authentication and shared key agreement.

Method steps performed by the server comprise receiving from the client a message, a message authentication code and a hash over the clients identifier and a corresponding shared key; processing said message authentication code and hash over the clients identifier and corresponding shared key, to find the shared key.

Other aspects and features of the present invention will become apparent to those ordinarily skilled in the art upon review of the following description in conjunction with the accompanying Figures.

DESCRIPTION OF DRAWINGS

Embodiments of the present invention will now be described, by way of example only, with reference to the attached Figures, wherein.

DETAILED DESCRIPTION

Figure 1:
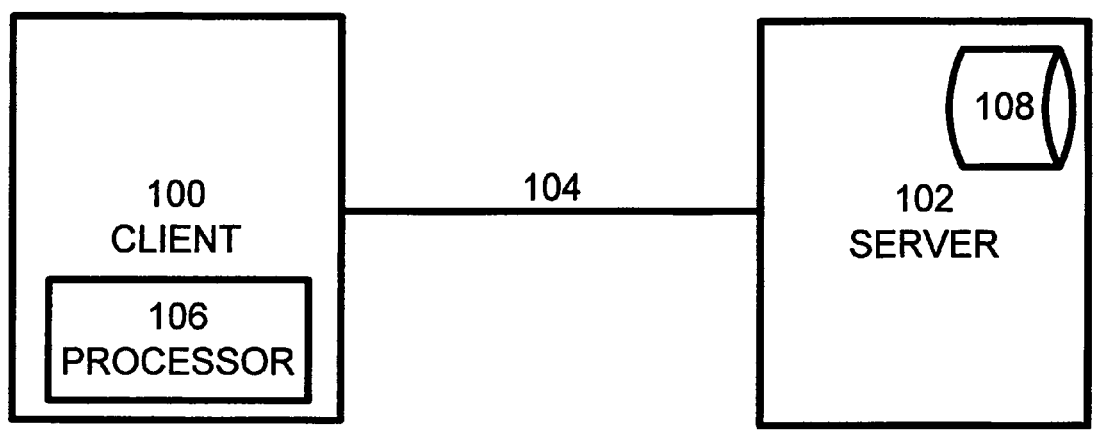
FIG. 1 illustrates schematically a system for protocol exchange in a typical known shared key protocol.

A typical known system architecture for secure communication using a shared key protocol is shown in FIG. 1 and includes an initiator 100, a receiver 102 and a data communication channel 104 over which the initiator 100 and receiver 102 can communicate. The initiator 100 may be implemented as a client comprising a processor 106 capable of generating a message authentication code, herein referred to as MAC, of the message to be transmitted. The receiver 102 may be implemented as a server comprising a user database 108, structured, for example, as a linear array to store client shared keys. In order for the receiver 102 to determine the shared key needed to communicate with the initiator 100, the initiator 100 must identify itself to the receiver 102 with an identifier.

Figure 2:
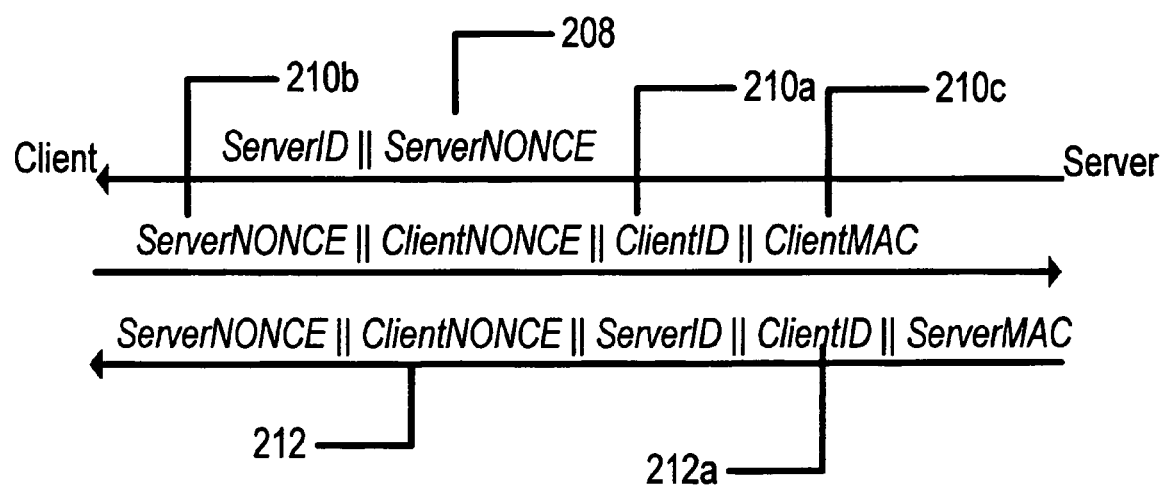
FIG. 2 illustrates schematically a method for protocol exchange in a typical known shared key protocol.

A typical known protocol exchange between a client and a server is presented in FIG. 2. The server introduces itself by sending a random challenge 208 ServerNONCE to the client. The client responds to the challenge with a combination of its identifier 210a, herein referred to as ClientID, or ID, a message comprising a response to the server's challenge 210b ClientNONCE, and a MAC 210c of the plaintext message ClientMAC.

Upon receipt of these elements from the client, the server looks up the client's key, using the ClientID 208a, in the user database 206, and subsequently extracts the relevant shared key from the database 206. The server uses the shared key to determine whether the response to the challenge 210b, ClientMAC, is authentic by locally computing a MAC of the message from the client. Upon verification, the server can be assured that the entity at the other end is in possession of the correct shared key.

In the next message 212, the client performs a similar function where it verifies the authenticity of the server by comparing a MAC 212a sent by the server, ServerMAC with a locally computed copy of the ServerMAC. Once the client has verified the authenticity of the server, the two sides may proceed to derive keying material for future session exchanges, based on the shared key, and the exchanged values (xxxxNONCE).

As described above, shared key protocols use Message Authentication Codes (MACS) to verify that client and server ends are in possession of the correct shared-key, and are thus very likely to be the entity that is expected. Client and server each emit random challenges to the other to prove, via the respective MAC, that they are in possession of the correct key. A MAC is a hash of the plaintext message that a sender sends to the receiver provides a way for the receiver to verify that the message it received was not tampered with during transmission.

Selected MAC functions are typically based on cryptographic hash functions, which have specific important properties a) they are computationally infeasible to invert, i.e. infeasible given any output value to determine which input value produced it; and b) they have very low probability of collision, i.e. it is improbable that two randomly chosen input texts will produce the same output text. For a perfect hash function of residue length N bits, the probability of two random input texts colliding is exactly $2^{N/2}$. MACs rely on both the above properties to provide security. Since MACs generally merge the key material into the data to be MACed prior to invoking the underlying hash function, the infeasibility of inversion property is important. Low collision probability is important to provide that it should be practically impossible, up to the previously mentioned probability bound, for two randomly chosen messages to produce the same MAC. As such, MACs provide security by relying on both of these properties.

Nevertheless, a typical shared key protocol as described above method with reference to FIG. 2 requires disclosure of the Client ID in plain text early in the exchange, which may be undesirable, and may be subject to passive and active identity disclosure attacks.

Figure 3:
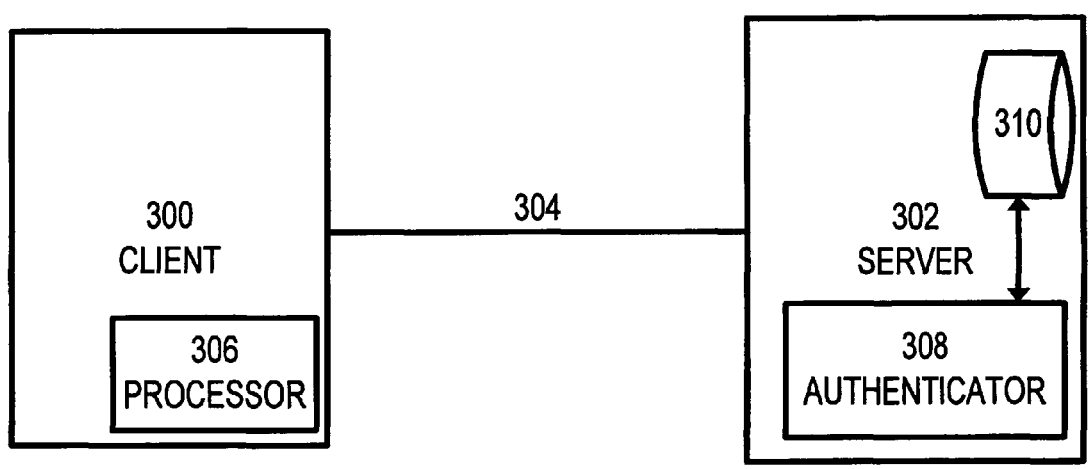
FIG. 3 illustrates schematically a system for protocol exchange in a shared key protocol providing identity hiding according to embodiments of the present invention.

An embodiment of the present invention will now be described with reference to the system shown in FIG. 3. The system includes an initiator 300, a receiver 302 and a data communication channel 304 over which the initiator 300 and receiver 302 can communicate.

The physical data communication channel 304 on which the message is transmitted may be, for example, a wireless or wired connection. The initiator may be implemented as a client 300 comprising a processor 306 to generate a MAC of the plain text message to be transmitted, and differs from known systems, in that the initiator transmits a Hint of the client identifier, ClientIDHint, instead of the Client ID. The Hint is a function of the ID that cannot be readily inverted to produce the ClientID. For example, the ClientIDHint may be a permutated value of the ClientID, one example of which may comprise a hash over the ClientID.

The receiver 302 may be implemented as a server comprising an authenticator 308 and a database 310. The authenticator 308, which may be, for example, an access point in an 802.1x protocol, authenticates initiators by using the hint of the initiator's identifier ClientIDHint to find the corresponding shared key in the database 310, where the database 310 may be utilized as part of a Remote Authentication Dial-In User Service (RADIUS). The database 310 may reside within the server or on a separate machine and may be structured in a variety of ways such as a linear array or a number of linear arrays.

When the database 310 is implemented as a number of linear arrays, instead of a single linear array, the search efficiency can be improved by a factor of N, where N is the number of linear arrays, otherwise known as buckets, containing user data. Using this structure, a simple approach would be to use a ClientIDHint which is a trivial hash function, to determine which bucket a given user belongs to.

Figure 4:
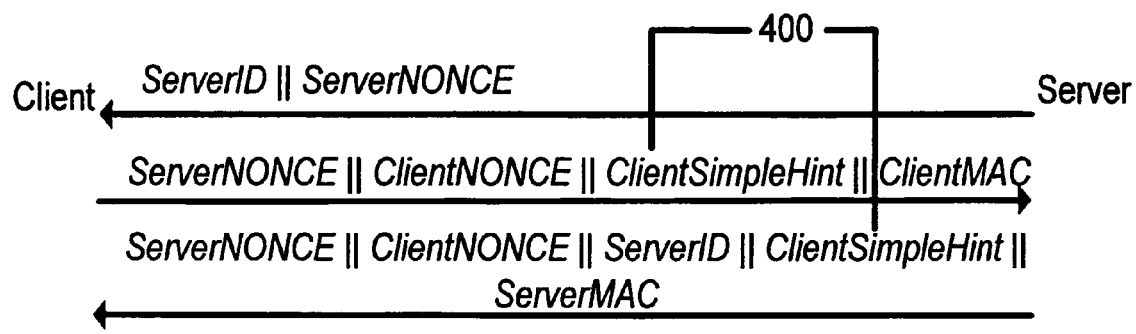
FIG. 4 illustrates schematically a method for protocol exchange in a shared key protocol providing identity hiding using a ClientSimpleHint according to an embodiment of the present invention.

Such a hash function could be, for example, the sum of all the bytes in the ClientID modulo N. This provides an improvement over known systems in that it replaces the need to use the ClientID with the simple modular-sum hash of the ClientID, which will herein be referred to as ClientSimpleHint 308. This approach has an advantage from an efficiency point of view where selecting, for example, 256 buckets, reduces the linear-search expense considerably. Consequently, the protocol exchange in FIG. 4 is an improvement of the exchange in FIG. 2, and replaces ClientID with a permutated ClientID, such as ClientSimpleHint 400, such that the permutated value cannot be readily inverted to produce the ClientID.

In the above protocol, only one key can possibly cause the MAC to be correct for any given message. This means that in any given pool of keys, only one of those keys will likely satisfy the MAC. Since a key is associated uniquely with an individual user or client, any given correct message and MAC pair must necessarily uniquely identify the client that produced the message, independent of whether or not the client has asserted their ID. In effect, the need for the client asserting their identity, i.e. using ClientID as described above with reference to FIG. 2, is redundant. Instead, the server need only search through its space of all possible client keys until it finds a correct match based on the message and MAC tuple. Once the server finds such a match it unambiguously knows the identity of the client of the message exchange, and that the client is currently in possession of the appropriate key, or alternatively if a match fails, that it is dealing with an impostor. The server tests the equality shown below:

$MAC_k(message) = transmittedMAC$ $k = \{set\ of\ all\ user\ keys\}$

In the above equality, the key, k is selected iteratively from the pool of all possible keys in the server database and is used to produce MAC values that are compared with the MAC actually transmitted by the purported client. Although such a computation could become very expensive if the population of clients, and implicitly, keys, is large, it is nevertheless possible for the server to determine the shared key based on the ClientIDHint without needing to receive the ClientID from the client.

In practice, the user database in such a scheme is not structured as a linear array, but instead, a search-efficient structure is used. To provide a computationally efficient equality-search, while identity protection/hiding the database of users in the server is structured not as a linear array, but rather as a number of linear arrays, the search efficiency can be improved by a factor of N, where N is the number of linear arrays ("buckets") containing user data. Selecting, for example, 256 buckets reduces the linear-search expense considerably as mentioned above.

Due to the probabilistic nature of cryptographic hash collisions, one can only assert a likelihood near the limit of $X/2^{N/2}$ where X is the number of database entries, and N is the residue size of the hash function, in bits. Even for large databases, for modern hash functions, the probability of picking the wrong entry is still extremely low.

On the other hand, a simple ClientIDHint, such as the sum modulo N hash as described above, provides limited identity hiding functionality in some scenarios. Although the purported attacker can no longer rely on the ClientID to easily find the shared key, an attacker can still determine which subpopulation the client belongs to, based on either passive or active intervention. If the subpopulation is large, the use of a simple ClientIDHint may be sufficient, provided that the attacker has only partial knowledge of the identities in that subpopulation. If each subpopulation consists of only a few dozen users, for example, isolating to a given subpopulation may likely provide only temporary identity hiding. Specifically, the attacker can use other data to weed out unlikely candidates from the subpopulation since, if the attacker knows the list of ClientIDs for the entire database, he can compute the hash himself. Thus for small subpopulations an alternative embodiment may be preferred.

Figure 5:
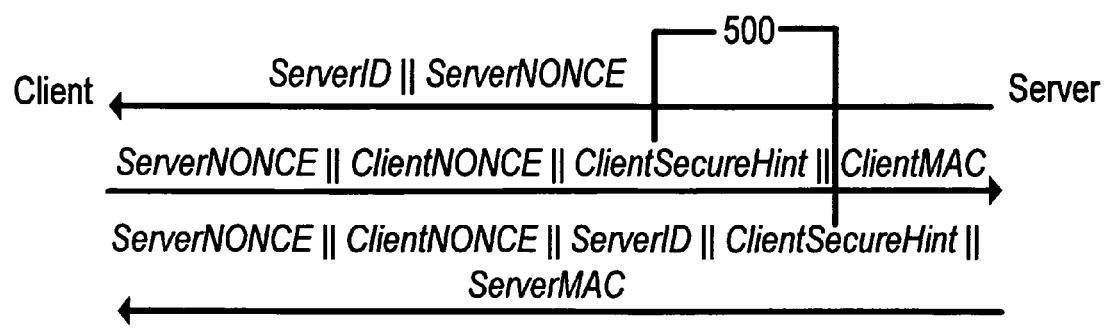
FIG. 5 illustrates schematically a method for protocol exchange in a shared key protocol providing identity hiding using a ClientSecureHint according to another embodiment of the present invention.

A method according to another embodiment of the present invention, provides an alternative form of ClientIDHint to provide identity hiding functionality. Specifically, this alternative significantly reduces the attacker's ability to determine the contents of the subpopulations, even if the attacker is in possession of the list of all ClientIDs. The improved protocol exchange is illustrated in FIG. 5.

In this protocol, the ClientIDHint takes the form of a short hash of the ClientID, herein referred to as ClientSecureHint 500, which is computed in such a way as to reveal very little information to the attacker. The hash is computed by using a cryptographic hash over both the ClientID, and the corresponding shared key. The resulting hash is then reduced to the one or two octets necessary to identify a hash bucket in the database owned by the server. The hash is computed using the following equation:

$ClientSecureHint = Reduce(H(ClientID, ClientKey))$

In the above equation, H(x) is the chosen cryptographic hash function, and Reduce(x) is a function to reduce the output of the hash function to the required number of bits. For example, the hash function may use known algorithms such as MD5, SHA-1, or the HMAC and variants, or other suitable known hash functions, such that appropriate groupings of output octets from the hash functions may be XORed together to form the final reduced result placed in ClientSecureHint 500.

There are many other suitable hash functions that may be used, for example, Tiger, RIPEM-D, MD2, MD5 and more recently the SHA-2 family, e.g. SHA2-256, SHA2-384, SHA2-512.

This approach does not require a particular method of reduction, and collision resistance of the underlying hash function is not necessarily required. However, infeasibility of inversion (resistance to first pre-image attack) is quite important since the users key is used as part of the input to the function shown in paragraph [0040].

In a method according to an alternative embodiment, not shown in the figures, the ClientSecureHint 500 is generated without the Reduce function.

It should be noted that when a ClientSecureHint is used, an attacker has very little information upon which to determine the identity of the client. Even if the attacker is in possession of the entire list of valid ClientIDs, and even if the attacker is a subscriber himself to the same service, he cannot determine the likely bucket to which any other randomly chosen user belongs, since he is not in possession of their key.

Thus by observing two important properties of hash functions, that they are non-invertible within reasonable bounds of computability, and collision resistant, the ClientSecureHint provides an indirect way of determining the identity of the client, without revealing that identity to an active or passive outside attacker.

In considering the performance of a shared key scheme with identity hiding as described above, it is useful to compare this scheme against a functionally similar scheme such as Diffie-Hellman and RSA. A test implementation of the described shared key scheme was coded in C, and its performance numbers were gathered and compared to the performance of a comparable scheme. In the shared key scheme, for a user population of 100000 users, with 256 bins, an average of 195 items was required to be searched before finding an item. On a 2.6 GHz desktop machine and using a MAC function based on the MD5 algorithm with, each item in the linear hash bucket needed approximately 1.5 μsec to be processed. This resulted in an average search cost of roughly 292 μsecs of CPU time. In contrast, the comparable Diffie-Hellman/RSA scheme on the same desktop system needed approximately 16.5 msec, or ~50 times more CPU time. In practice, the performance ratios will vary from architecture to architecture, but the above test gives an indication that the performance cost of using an identity hiding scheme with secure hints is attractive when CPU costs are at a premium.

When user populations become very large, the number of buckets can be increased to keep the linear-search length down and to keep average performance levels within reasonable bounds. However, the buckets should not be made too small. Consider the situation in which there is one bucket per client. While the attacker in this situation still is not able to pre-compute a mapping between ClientIDs and buckets, having one bucket per client makes it easier for the attacker to perform attacks based on elimination.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of hiding an initiator's identity (ID) in a shared key authentication protocol, the method comprising the steps of:
    applying, by an initiator, a function which cannot be readily inverted to the initiator's ID to produce a Hint of the ID, the Hint of the ID enabling a receiver to identify a subset of possible shared keys from a plurality of known shared keys, the subset containing fewer than all of the known shared keys;
    transmitting the Hint of the ID and a Message Authentication Code (MAC) created from a message using a shared key associated with the initiator;
    receiving the Hint of the ID and the MAC by the receiver;
    using, by the receiver, the Hint of the ID to determine the subset of possible shared keys;
    creating, by the receiver, MACs of the message using shared keys within the subset of possible shared keys to look for a shared key that will produce a MAC of the message that matches the MAC of the message transmitted by the initiator; and
    upon producing a MAC of the message from one of the shared keys that matches the MAC of the message transmitted by the initiator, determining therefrom the identity of the initiator.

2. A method according to claim 1, wherein the Hint comprises a hash function over the ID.

3. A method according to claim 2, wherein the Hint comprises a modular N sum hash of the initiator's identity where N corresponds to N hash buckets in a shared key database, each of the N hash buckets containing one of the subsets of possible shared keys.

4. A method according to claim 1, wherein the Hint comprises a cryptographic hash function over the ID.

5. A method according to claim 1, wherein the Hint comprises a cryptographic hash over both the ID and a corresponding shared key.

6. A method according to claim 5, wherein the resulting hash is reduced to a required number of bits for identification of a hash bucket in the shared key database.

7. A method according to claim 6, wherein the Hint is determined by Hint=Reduce(H(ID, Key)), where H(x) is a chosen hash function and Reduce is a function to reduce the output of the hash function to the required number of bits.

8. A method according to claim 7, wherein the chosen hash function H(x) is one of MD5, SHA-1 and HMAC functions.

9. A method according to claim 7, wherein the chosen hash function H(x) is one of Tiger, RIPEM-D, MD2, MD5, and a function of SHA-2 family.

10. A method of hiding an initiator's identity (ID) in a shared key authentication protocol, the method comprising the steps of:
    applying a function which cannot be readily inverted to the initiator's ID to produce a Hint of the ID, the Hint of the ID enabling a receiver to identify a subset of possible shared keys from a plurality of known shared keys, the subset containing fewer than all of the known shared keys;
    applying a shared key associated with the ID to a message to produce a MAC;
    transmitting the Hint of the ID, the message, and the MAC;
    receiving the Hint of the ID, the message, and the MAC;
    determining a set of possible shared keys based on the received Hint of the ID;
    applying shared keys in the set of possible shared keys to the message to produce locally-determined MACs; and
    comparing the locally-determined MACs to the received MAC to complete authentication.

11. A method according to claim 10, wherein the hint comprises a simple hash of the initiator's identity ID.

12. A method according to claim 10, wherein the hint comprises a modular N sum hash of the initiator's identity where N corresponds to N hash buckets in a shared key database.

13. A method according to claim 10, wherein the hint comprises a cryptographic hash over both the initiator's ID and the initiator's shared key.

14. A method according to claim 13, wherein the resulting hash is reduced to a required number of bits for identification of a hash bucket in the database.

15. A method according to claim 13, wherein the hint=Reduce(H(ID, Key)) where H(x) is a chosen hash function and Reduce is a function to reduce the output of the hash function to the required number of bits.

16. A method according to claim 15, wherein the chosen hash function H(x) is one of MD5, SHA-1, HMAC, Tiger, RIPEM-D, MD2, MD5, and a function of SHA-2 family.

17. A system according to claim 11, wherein the database of shared keys is structured as N linear arrays, with array indices based on the hint of the initiator identity.

18. A system for hiding an initiator's identity (ID) in a shared key authentication protocol, comprising:
  a first computer processor configured to implement a receiver to receive a Hint of the initiator's ID, a message, and a Message Authentication Code (MAC) created using a shared key associated with the initiator;
  a database of shared keys; and
  an authenticator to provide authentication of the initiator based on the Hint of the ID, the authenticator being configured to use shared keys in the database to create MACs of the message to look for a shared key that is able to create a MAC of the message that matches the received MAC created using the shared key associated with the initiator, wherein the Hint is a function of the initiator's ID that cannot be easily inverted to produce the initiator's identity, and enables the authenticator to identify a subset of possible shared keys from the database of shared keys, the subset containing fewer than all of the known shared keys.

19. A system for hiding an initiator's identity (ID) in a shared key authentication protocol comprising a processor to generate a hint of the initiator's ID, a message, and a Message Authentication Code (MAC) of the message using an initiator's shared key for transmission to an authenticator in the shared key authentication protocol, the Hint being a function of the initiator's ID that cannot be easily inverted to produce the initiator's identity, the Hint of the ID enabling the authenticator to identify a subset of possible shared keys from a plurality of known shared keys, the subset containing fewer than all of the known shared keys.

20. A tangible machine-readable medium encoded with processor-executable instruction sequences for hiding an initiator's identity (ID) in a shared key authentication protocol, the processor-executable instruction sequences being configured such that, when loaded into one or more computer processors, enable the one or more computer processors to perform a method comprising the steps of:
  applying a function to the initiator's ID to create a Hint of the ID which cannot be readily inverted to produce the initiator's identity, the Hint of the ID enabling an authenticator to identify a subset of possible shared keys from a plurality of known shared keys, the subset containing fewer than all of the known shared keys;
  creating a Message Authentication Code (MAC) of a message using a shared key associated with the initiator; and
  transmitting the Hint of the ID, the message, and the MAC of the message to an authenticator;
  wherein the authenticator will use the Hint of the ID to select the subset of possible shared keys and use the shared keys of the subset of shared keys to generate locally created MACs of the message to look for a locally created MAC of the message that matches the transmitted MAC of the message.

21. A method of hiding an initiators identity (ID) in a shared key authentication protocol for authentication and shared key agreement between an initiator computer and a receiver computer, the method comprising steps of:
  generating, by the initiator computer, a Hint of the ID, the Hint being a function of the ID which cannot be readily inverted to produce the initiators identity, the Hint of the ID enabling the receiver to identify a subset of possible shared keys from a plurality of known shared keys, the subset containing fewer than all of the known shared keys;
  generating, by the initiator computer, a Message Authentication Code (MAC);
  transmitting, by the initiator computer, the Hint of the ID and the MAC to the receiver for authentication and key agreement.

22. A method according to claim 21, wherein the step of generating a Hint of the ID comprises generating a hash over the ID.

23. A method according to claim 21, wherein the step of generating a Hint of the ID comprises generating a cryptographic hash over the ID.

24. A method according to claim 21, wherein the step of generating a Hint of the ID comprises generating a cryptographic hash over both the ID and a corresponding shared key.

25. A method according to claim 21, wherein the initiator is a client and the receiver is a server.

26. A method of hiding an initiator's identity (ID) in a shared key authentication protocol for authentication and shared key agreement between an initiator computer and a receiver computer, the method comprising the steps of:
  receiving, by the receiver computer, from an initiator a Hint of the ID and a Message Authentication Code (MAC) value, the Hint being a function of the ID which cannot be readily inverted to produce the initiator's identity, the Hint of the ID enabling a receiver to identify a subset of possible shared keys from a plurality of known shared keys, the subset containing fewer than all of the known shared keys;
  using, by the receiver computer, the Hint of the ID to identify the subset of possible shared keys that could have been used by known initiators to create the MAC value; and
  using, by the receiver computer, shared keys from the subset of possible shared keys to generate local MAC values to look for a shared key that will generate a local MAC value that matches the received MAC value.

27. A method according to claim 26, wherein the Hint of the ID received from the initiator was created by the initiator by computing a hash over the ID, and wherein the receiver previously calculated a hash of the initiator ID during an initial key exchange process with the initiator and used the hash of the initiator ID to store the shared key associated with the initiator in a shared key database.

28. A method according to claim 27, wherein the Hint of the ID comprises a cryptographic hash over the ID.

29. A method according to claim 27, wherein the Hint of the ID comprises a cryptographic hash over the ID and a corresponding shared key.

30. A method according to claim 26, wherein the initiator is a client and the receiver is a server.

* * * * *